Feb. 11, 1930.          H. H. VAIL          1,746,805
               AUTOMATIC CLUTCH
            Filed May 13, 1927        2 Sheets-Sheet 1

Fig. 1.

Fig. 5.

Inventor
HENRY H. VAIL.
By Robert M. Barr.
Attorney

Feb. 11, 1930. H. H. VAIL 1,746,805
AUTOMATIC CLUTCH
Filed May 13, 1927 2 Sheets-Sheet 2
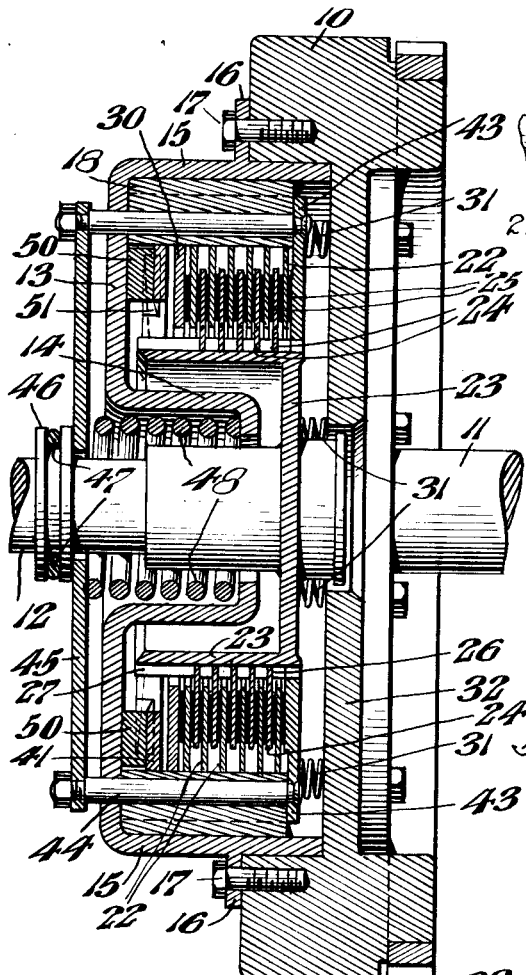
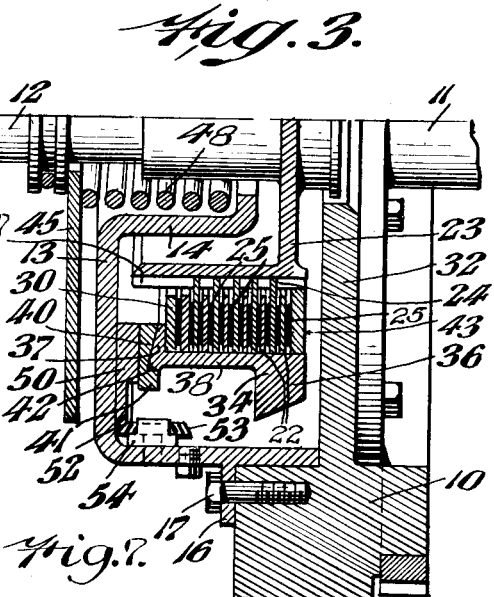
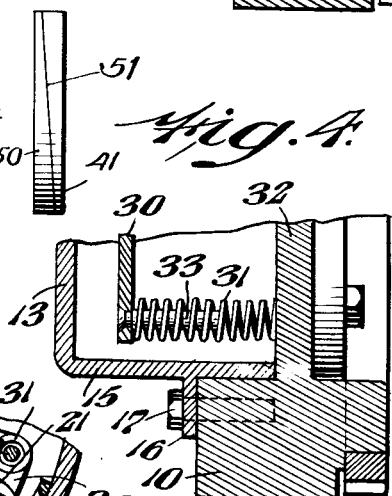
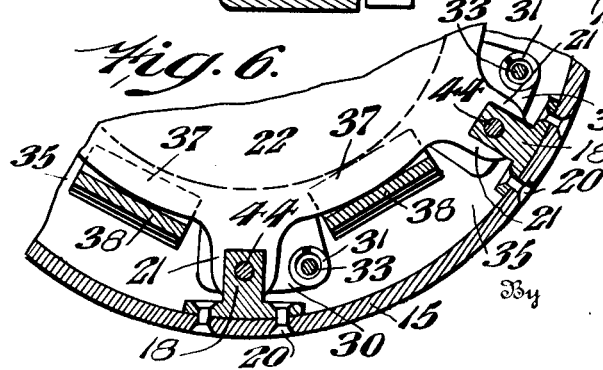
Inventor
HENRY H. VAIL,
By Robert M. Barr
Attorney Patented Feb. 11, 1930

1,746,805

UNITED STATES PATENT OFFICE

HENRY H. VAIL, OF CAMDEN, NEW JERSEY, ASSIGNOR TO AUTOMATIC DRIVE AND TRANSMISSION COMPANY, OF GLOUCESTER CITY, NEW JERSEY, A CORPORATION OF NEW JERSEY

AUTOMATIC CLUTCH

Application filed May 13, 1927. Serial No. 191,097.

The present invention relates to clutches for transmitting power from a driving shaft to a driven shaft and relates more particularly to an automatically operable friction clutch under centrifugal control.

It has heretofore been proposed in automotive construction to provide clutch mechanisms which operate under running conditions as a substitute for the ordinary manually operated clutch generally in use where gear shifting is a necessary part of the operation of the vehicle. Such clutch mechanisms are not only so expensive as to prove commercially impractical, but in addition have been open to the serious objection that no provision is made for gaining manual control of the clutch in case gear-shifting becomes necessary and such a condition is constantly rising. Also another drawback to the successful operation of an automatic clutch has been the use of abnormally heavy springs as means to resist the lateral movement of the clutch disc at all speeds.

The impractical and unsuccessful ideas heretofore tried out have led to the present invention wherein all prior difficulties have been successfully overcome and wherein some of the objects are to provide an improved automatic clutch for power transmission purposes; to provide a centrifugally operated multiple-disc clutch for use in place of the ordinary manually controlled clutch used in motor vehicles; to provide an automatic clutch for motor vehicles which is capable of manual operation at the will of the operator; to provide a clutch mechanism which can be quickly installed in an automobile in place of the usual clutch whereby control of the power transmission becomes automatic though still remains subject to manual control if desired; to provide a complete clutch unit for automobiles wherein the speed of the engine automatically controls the operation of the unit; and to provide other improvements as will hereinafter appear.

In the accompanying drawings Fig. 1 represents a side elevation in part section of a clutch embodying one form of the present invention; Fig. 2 represents a section on line 2—2 of Fig. 1; Fig. 3 represents a detail section on line 3—3 of Fig. 1; Fig. 4 is a sectional detail on line 4—4 of Fig. 1; Fig. 5 represents a sectional detail of the preferred adjusting means; Fig. 6 represents a sectional detail showing the clutch disc and fly wheel assembly; and Fig. 7 represents a detail of the wedge ring construction.

Referring to the drawings, one form of the present invention is shown attached to a fly wheel 10 which is rigidly mounted upon the driving shaft 11 of the power unit and is usually the regular fly wheel installation of the motor vehicle to which the clutch of the present invention is to be applied. In the present instance the shaft 11 is that of the motor in an automobile. The shaft 11 is arranged to transmit motion to a driven shaft 12 through the mechanism of the present invention and which preferably replaces the ordinary manually controlled clutch. As here shown, the clutch mechanism is contained within a housing comprising a plate 13 formed with a hub 14 at its central portion and a circumferential flange 15, the outer diameter of which is such as to fit snugly within one side of the body part of the fly wheel 10. A ring 16 is formed on the flange 15 to receive spaced studs 17 by which the housing is clamped to the fly wheel 10. When the housing and fly wheel 10 are thus assembled, the former provides a circumferentially arranged chamber for oil in which the clutch parts run.

For transmitting motion from the fly wheel 10 to the driven shaft 12, the housing flange 15 has inwardly and radially arranged lugs 18 fastened by rivets 20 and arranged at suitably spaced intervals to seat respectively between pairs of ears 21 formed as radial projections upon a plurality of clutch plates 22. These clutch plates 22 encircle a drum 23 and are out of contact therewith but transmit motion thereto through the medium of another set of clutch plates 24 which alternate in interfitting relation with the aforesaid clutch plates 22. Annular plates 25 of suitable friction material are interposed between the respective opposed faces of the two sets of clutch plates 22 and 24. The clutch plates 24 are internally toothed as shown at 26 to interfit with teeth 27 provided upon the outer periphery of the drum 23. It will thus be evident that the assembling of the clutch parts is a very simple operation because each plate can slide into place by merely matching the lugs 18 and ears 21, and the toothed parts 26 and 27. As so assembled however, there is no pressure to create the required friction for driving purposes and the mechanism for bringing about this necessary function will now be explained.

For causing the plates 22, 24 and 25 to be pressed into frictional driving relation, a shiftable clamping ring 30 is carried in interfitting circumferential relation with the lugs 18 of the flange 15 and forms one end plate of the clutch unit. Normally this ring 30 is held out of clamping position by a plurality of coil springs 31 arranged to be placed under compression between the ring 30 and the web 32 of the fly wheel 10. Centering pins 33, in this instance, fast to the ring 30 insure the springs 31 being maintained in proper operating relation. Motion is transmitted to the ring 30 by a plurality of weights 34 arranged at suitable intervals about the periphery of the assembled clutch plates and respectively located in recesses 35 provided in the inner circumference of the main ring 15. These weights 34, each consists of a head 36 and a tail piece 37 connected by a web 38 and the arrangement is such that the piece 37 extends in the opposite direction from the head 36 in order to seat against the outer face of the ring 30 while the head 36 is free to move outwardly under centrifugal force. The weights 34 are pivoted by seating the tail pieces 37 respectively in notches 40 formed in an annular member 41 and in this connection it should be noted that the heel 42 of each weight 34 is slightly rounded to give an effective pivoting action to the weights 34. Since the member 41 is held against movement in the direction of thrust of the weight heel 42 by contact with the ring 50 the centrifugal force, created by the rotation of the parts, will cause the heads 36 to swing outwardly in proportion to the created force and thus swing the respective tail pieces 37 in the direction required to move the ring 30 against the tension of the springs 31 so that the clutch discs are pressed together to transmit motion from one set of plates to the other set.

In order to resist the thrust transmitted by the clamping movement of the ring 30 the side of the clutch plate assembly opposite to the ring 30 is provided with a backing ring 43 carrying circumferentially spaced bolts 44. These bolts 44 are arranged parallel to the axis of rotation and project through the lugs 18 and housing 13 for attachment to an operating disc 45 which in assembled condition of the clutch corresponds to and takes the place of the ordinary clutch operating disc and hence can be actuated at will by the slidable sleeve 46 which is shifted by the lever fork 47 from the usual foot pedal. The disc 45 is under the pressure of a coiled spring 48 seated in the hub 14 and as this spring 48 is stronger than the combined effect of the springs 31, the backing plate 43 will be held in position for the desired clutching action as brought about by the weights 34. Normally this is the position of the parts under automatic running conditions, but still a manual control is possible because pressure upon the clutch pedal will be transmitted to the disc 45, overcome the spring 48 and shift the backing plate 43 to declutched position.

In order to provide for adjustment of the clutch plates with respect to each other and with respect to the weight tail pieces 37, an adjusting ring 50 having a cam side face 51 is interposed between the member 41 and the inner wall of the housing 13. The face 51 has a cam formation circumferentially thereof so that if it is turned about its axis it will cause the member 41 to move axially towards the clutch plates and thus provide for the precise initial clearance of the plates to allow slippage when the motor is idling. The adjusting ring 50 is provided with a gear segment 52 in mesh with a bevel pinion 53 journalled in a frame 54 fixed to the housing. The pinion 53 has an end-slotted stud 55 which is accessible through the wall of the housing and whereby the pinion 53 can be turned to give the relatively slight adjustment of the ring 50 for the required purpose. This adjustment may also be used to bring about the friction engagement of the clutch plates should it be desired to render the automatic control ineffective and turn the control over to the ordinary manual one. Thus by inserting a screw driver in the slotted end of the stud 55 the pinion 53 can be turned to transmit sufficient movement to the adjusting ring 50 to cause the ring member 41 to close the clearance which is necessary for the slipping action when under automatic control and thus cause the clutch to revert to a manual control type.

In the use and operation of the present invention it will be apparent that the clutch can be initially installed for use in an automobile precisely as the ordinary standard clutch is installed, or it can be substituted for a standard clutch by merely removing the latter from the fly wheel and mounting the new clutch in its place. When installed the clutch of the present invention operates as follows: The parts as assembled are shown in Fig. 2 and the position of the disc 45 is such that it will be readily engaged by the sleeve 46 when the clutch pedal is operated. Normally the clutch pedal is not used and the disc 45 is held under the pressure of the spring 48 so that the backing clutch plate 43 is held to resist the thrust transmitted through the friction clutch plates 24 and 30.

This thrust is initiated by the pivotal swinging of the weights 36 under the centrifugal force due to the rotation of the fly wheel 10 and its associated parts and against the relatively light tension of the springs 31. As the speed of rotation increases the action of the weights 36 produces a corresponding increase in the clamping pressure upon the clutch plates while a decrease in the speed of rotation brings about a diminishing of the clutch friction pressure so that at idling speeds there will be insufficient plate pressure to transmit motion from the driving shaft to the driven shaft. As a result the clutch of the present invention gives a complete automatic control for driving purposes so that the transmission can be left in high gear for all forward driving and while stopping, starting, or climbing hills, though naturally it must be shifted to reverse position when backing the vehicle. It will further be evident by providing the cam control rings 41 and 50 that a very delicate adjustment can be made of the clutch plate and thus allow the backing plate 43 to become the major control unit under the action of the disc 45 to thereby convert the clutch into a manual control clutch functioning as does any standard foot pedal operated clutch.

Having now fully described my invention, I claim:

1. A clutch mechanism comprising a part connected to a driving shaft, a part connected to a driven shaft, two sets of friction clutch plates connected respectively to said parts, said plates being arranged alternately side by side and free to move toward and away from each other, a spring pressed backing plate normally pressing against one end friction plate to resist thrust transmitted to the opposite side of said plate, a clamping plate opposite the other end friction plate, springs holding said clamping plate out of pressure contact with the adjacent end plate, centrifugally operated devices for shifting said clamping plate against the pressure of said springs to press said clutch plates together, and manually operable means to clamp said clutch plates together whereby said centrifugal devices become ineffective and said clutch becomes a manually controlled one.

2. A clutch mechanism comprising a part connected to a driving shaft, a part connected to a driven shaft, two sets of friction clutch plates connected respectively to said parts, said plates being arranged alternately side by side and free to move towards and away from each other, a spring pressed backing plate normally pressing against one end friction plate to resist thrust transmitted to the opposite side of said plate, a clamping plate opposite the other end friction plate, springs holding said clamping plate out of pressure contact with the adjacent end plate, centrifugally operated devices for shifting said clamping plate against the pressure of said springs to press said clutch plates together, a pair of rings arranged in face to face relation and juxtaposed in spaced relation to said clamping plate, one of said rings having a cam-shaped face, and means to shift one of said rings with respect to the other whereby the clearance adjustment of said clutch is varied.

3. The combination of a fly wheel and a unitary clutch, a driving shaft connected to said fly wheel, a driven shaft, said clutch comprising two sets of plates, one set of said plates being arranged to rotate with said fly wheel, and the other set of plates being arranged to rotate with said driven shaft, automatic and manually controlled means for respectively actuating said clutch, and means to render said automatic means ineffective whereby said clutch becomes a manually actuated clutch.

4. A clutch mechanism comprising a part connected to a driving shaft, a part connected to a driven shaft, a friction clutch plate connected to one part, a second friction clutch plate connected to the other part, said plates being arranged side by side and free to move toward and away from each other, a spring pressed backing plate normally pressing against one of said friction plates, a clamping plate opposite the other friction plate, springs holding said clamping plate out of pressure contact with the adjacent friction plate, centrifugally operated devices for shifting said clamping plate against the pressure of said springs to press said clutch plates together, and manually operable means to clamp said clutch plates together whereby said centrifugal devices become ineffective and said clutch becomes a manually controlled one.

Signed at Philadelphia, county of Philadelphia, State of Pennsylvania, this 11th day of May, 1927.

HENRY H. VAIL.